April 28, 1964   R. R. TONELLI   3,130,443
COASTER WAGON HANDLE
Filed March 20, 1962
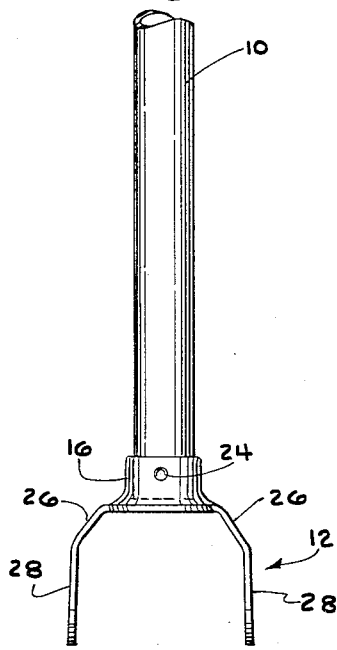
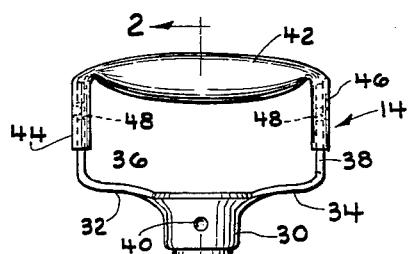
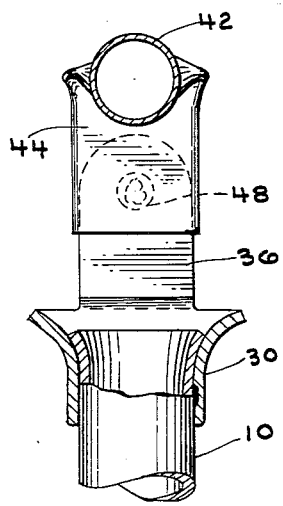
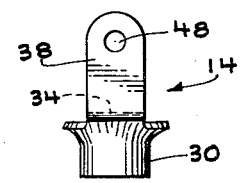
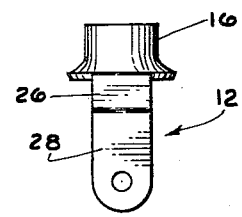
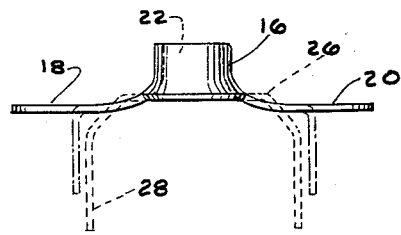
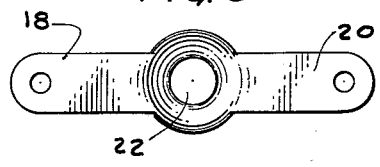
INVENTOR.
RUGGERO RENATO TONELLI
BY
Ooms, McDougall and Hersh
ATT'YS.

United States Patent Office 3,130,443
Patented Apr. 28, 1964

3,130,443
COASTER WAGON HANDLE
Ruggero Renato Tonelli, Chicago, Ill., assignor to Radio Steel & Mfg. Co., Chicago, Ill., a corporation of Illinois
Filed Mar. 20, 1962, Ser. No. 180,986
8 Claims. (Cl. 16—110)

This invention relates to coaster wagons and more particularly to a new and improved handle for coaster wagons.

It is an object of this invention to produce a coaster wagon handle of improved strength and appearance and it is a related object to produce a coaster wagon handle of the type described which can be formed of standardized parts that can be interchangeably used either at the fork end of the handle or at the grip end of the handle thereby materially to reduce the cost and inventory of parts required for mass production of such handles and which embodies a hand grip of improved strength and appearance as well as improved comfort and grip.

These and other objects and advantages of this invention will hereinafter appear and for purposes of illustration, but not of limitation, an embodiment of the invention is shown in the accompanying drawing, in which—

FIG. 1 is a front elevational view of the coaster wagon handle embodying the features of this invention;

FIG. 2 is a sectional view taken substantially along the line 2—2 of FIG. 1;

FIG. 3 is a side elevational view of the fork element adapted to be joined as a part of the grip end portion of the wagon handle;

FIG. 4 is a side elevational view of the fork element adapted to be joined to the opposite end of the handle bar;

FIG. 5 is a front elevational view of the fork element illustrating its shape prior to being bent to the fork shapes shown by the broken lines; and FIG. 6 is an end view of the fork blank shown in solid lines in FIG. 5.

Referring now to the drawing, the wagon handle is illustrated in FIG. 1 as being formed of an elongate handle bar 10 formed of a metal rod or tubular member having a steering fork 12 at one end and a handle grip 14 at the other end.

The steering fork 12 is formed of a blank, of the type shown in FIG. 5, having a central tubular section 16 with a pair of arms 18 and 20 extending outwardly diametrically oppositedly from one edge of the tubular section. The latter is formed with a bore 22 dimensioned to correspond to the external wall to wall dimension of the handle bar 10 so as to enable the tubular section 16 to receive the end portion of the bar in telescoping relationship therein for joinder one to the other by the upset or spot-weld 24 to secure the fork in fixed position on the end of the bar. For use as a steering fork, the arms 18 and 20 are formed to U-shape with the portion 26 adjacent the tubular section 16 extending angularly outwardly and downwardly while the end portions 28 extend parallel in the same direction as the handle bar but spaced one from the other by an amount corresponding with the bail that is usually provided on the outer end portion of the steering mechanism which forms a part of the pivoted portion of the wheel supporting axle of the wagon.

The handle grip 14 on the opposite end of the handle bar is formed of a fork member which in its blank form is substantially identical with the blank from which the steering fork is fabricated and it thus comprises a similar tubular section 30 with diametrically outwardly extending arms 32 and 34 which are bent to provide a portion adjacent the tubular section which continues to extend outwardly and end portions 36 and 38 which extend substantially perpendicularly in parallel spaced relationship from the ends of the outwardly extending arm portions 32 and 34.

As in the steering fork, the tubular section 30 of the handle grip receives the opposite end of the handle bar 10 in telescoping relationship therein for connection by suitable fastening means or upset, as illustrated by the numeral 40.

Interconnecting the spaced, parallel, outwardly extending end portions of the arms 36 and 38 is another tubular member 42 having a central body portion dimensioned to have a length corresponding to the spaced relationship between the parallel arms 36 and 38 and end portions 44 and 46 which are turned to extend substantially perpendicularly from the opposite ends of the body portion and which are flattened to reduce the tubular sections to elongate, substantially rectangularly shaped slots dimensioned to receive the end portions 36 and 38 of the arms in telescoping relationship therein whereby the ends of the tubular members receive the end portions 36 and 38 of the arms in telescoping relation with the telescoped portions being secured one to the other by a suitable metal fastening means, such as spot-welding or the like, and preferably merely by upsetting the adjacent portion of the arms 44 and 46, as illustrated in FIG. 1. The openings 48 are provided in the end portions of the fork members for use in effecting the attachment as described in the handle grip and in the steering fork for connection to the steering mechanism.

Thus a handle grip of rectangular shape is provided on end of the handle bar which is free of exposure to sharp edges which otherwise exist when one flat strip is welded in overlapping relationship with another flat strip, as is characteristic of the handle grips heretofore fabricated. Further, the use of a tubular member 2 which telescopes onto the end of the grip fork provides for a more effective assembly and one that gives marked increase in comfort, strength and appearance. A stronger and more efficient assembly is achieved at less cost from the standpoint of the materials and assembly since the same blanks can be interchangeably used for the steering fork on one end of the handle bar and the handle grip at the other end thereby to enable the lower cost mass production of parts and the maintenance of lesser inventory of parts. The telescoping relationship between the elements forming the handle grip provides for marked improvement in the interconnection capable of being effected in a simpler and less expensive way while at the same time improving the stability and strength of the connection.

As illustrated in FIG. 2, the tubular section of the fork members can be secured in the desired assembled relationship on the end portions of the handle bar by flaring out the end portions of the handle to conform with the curvature in the flared out portion of the tubular section thereby to militate against inadvertent displacement of the fork section from the end portion of the handle bar, with or without the employment of other metal attachment means.

It will be apparent from the foregoing that I have provided a marked improvement in the technology of fabrication of handles for coaster wagons and that I have produced a coaster wagon handle having improved strength and appearance as well as greater safety in use in the handle grip portion.

It will be understood that changes may be made in the details of construction, arrangement and operation, without departing from the spirit of the invention, especially as defined in the following claims.

I claim:
1. A handle for a coaster wagon having a bail portion extending forwardly from the front wheel steering mechanism, said handle comprising an elongate tubular member, a steering fork on one end of the tubular member formed of a central tubular section dimensioned to telescope with the end portion of the tubular member and being fixed thereto, a pair of arms radiating outwardly substantially diametrically from said tubular section and bent to conform with the contour on the end portion of said bail for attachment thereto, a handle fork on the opposite end of the tubular member formed of a central tubular section dimensioned to telescope with the end portion of the tubular member and being attached thereto, and a pair of arms radiating outwardly substantially perpendicularly from said tubular section and bent substantially to U-shape, and another tubular element bent to U-shape with the side arms of said U-shaped element being flattened to provide a slotted portion receiving the side arms of said handle fork in telescoping relation therewith and being attached thereto.

2. A handle for a coaster wagon having a bail portion extending forwardly from the front wheel steering mechanism, said handle comprising an elongate tubular member, a steering fork on one end of the tubular member formed of a central tubular section dimensioned to telescope with the end portion of the tubular member and being fixed thereto, a pair of arms radiating outwardly substantially diametrically from said tubular section and bent to conform with the contour on the end portion of said bail for attachment thereto, a handle fork on the opposite end of the tubular member formed of a central tubular section dimensioned to telescope with the end portion of the tubular member and being attached thereto, and a pair of arm radiating outwardly substantially perpendicularly from said tubular section and bent substantially to U-shape, and another tubular element bent to U-shape with the side arms of said U-shaped element being flattened to provide a slotted portion receiving the side arms of said handle fork in telescoping relation therewith and being attached thereto, said tubular element having a central tubular portion dimensioned to have a length corresponding to the width of the handle portion with the side arms thereof extending substantially perpendicularly from the ends of the central portion in spaced parallel relationship corresponding to the spaced relationship between the parallel end portions of the spaced arms on the handle fork, whereby the exterior gripping surface of said handle defined by said tubular element is free of discontinuities and sharp edges.

3. A handle as defined in claim 1 in which the fork members at each end of the tubular member are formed of substantially identical blanks having a central tubular section and a pair of arms radiating outwardly diametrically from said tubular section.

4. A handle as claimed in claim 1 in which the steering fork on the end of the tubular member is formed with a tubular section having an internal diameter corresponding to the external diameter of the tubular member to receive the end portion of the tubular member in telescoping relation therein.

5. A handle as claimed in claim 1 in which the arms of the steering fork are formed with openings in the end portions for attachment to the bail of the steering mechanism of the coaster wagon.

6. A handle as claimed in claim 1 in which the handle fork on the end of the tubular member is formed with a tubular section having an internal diameter corresponding to the external diameter of the tubular member to receive the end portion of the tubular member in telescoping relation therein.

7. A handle as claimed in claim 1 in which the handle fork is formed with the arms extending outwardly radially from diametrically opposed sides of the tubular section and with the end portions of said arms turned to extend substantially perpendicularly in spaced parallel relationship one with the other.

8. A handle as claimed in claim 7 in which the tubular element has a central tubular portion dimensioned to have a length corresponding to the width of the handle fork and arms extending substantially perpendicularly from the ends of the central portion in spaced parallel relation corresponding to the spaced relation between the parallel end portions of the spaced arms on the handle fork to receive said arms in telescoping relation therein.

References Cited in the file of this patent

UNITED STATES PATENTS

| | | |
|---|---|---|
| 2,015,948 | Martinello | Oct. 1, 1935 |
| 2,350,062 | Mosier | May 30, 1944 |
| 2,511,160 | Grobowski | June 13, 1950 |
| 2,624,168 | Clemson | Jan. 6, 1953 |
| 2,676,054 | Pasin | Apr. 20, 1954 |
| 2,727,753 | Johnson et al. | Dec. 20, 1955 |